United States Patent
Nakamura (10) Patent No.: US 8,174,581 B2
(45) Date of Patent: *May 8, 2012

(54) MOVING OBJECT IMAGE TRACKING APPARATUS AND METHOD

(75) Inventor: Hiroaki Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 587 days.

This patent is subject to a terminal disclaimer.

(21) Appl. No.: 12/389,228

(22) Filed: Feb. 19, 2009

(65) Prior Publication Data

US 2009/0262197 A1    Oct. 22, 2009

(30) Foreign Application Priority Data

Feb. 22, 2008 (JP) ................... 2008-041872

(51) Int. Cl.
H04N 5/225 (2006.01)
G06K 9/00 (2006.01)

(52) U.S. Cl. ........................ 348/169; 382/103
(58) Field of Classification Search .................. 348/169; 382/103

See application file for complete search history.

(56) References Cited

U.S. PATENT DOCUMENTS

2003/0156736 A1*  8/2003  Chiu et al. ..................... 382/103
2004/0190752 A1*  9/2004  Higaki et al. .................. 382/103

FOREIGN PATENT DOCUMENTS

JP     5-259722    10/1993
JP     2006-106910  4/2006

OTHER PUBLICATIONS

U.S. Appl. No. 12/265,017, filed Nov. 5, 2008, Hiroaki Nakamura.

* cited by examiner

Primary Examiner — Abdullahi Salad
(74) Attorney, Agent, or Firm — Ohlandt, Greeley, Ruggiero & Perle, L.L.P.

(57) ABSTRACT

An apparatus includes a computation unit computing a moving velocity of a moving object (MO) by differentiation on a first angle of a first-rotation unit and a second angle of a second-rotation unit, a setting unit setting a first-angular velocity of the first-rotation unit and a second-angular velocity of the second-rotation unit as angular-velocity-instruction values when the MO falls outside a correction range, and setting the second-angular velocity and a third-angular velocity as the angular-velocity-instruction values when the MO falls within the correction range, a detection unit detecting a fourth-angular velocity and a fifth-angular velocity of the first-rotation unit and the second-rotation unit, and a control unit controlling a driving unit to eliminate a difference between the fourth-angular velocity and an angular velocity corresponding to the first-rotation unit, and controlling the driving unit to eliminate a difference between the fifth-angular velocity and an angular velocity corresponding to the second-rotation unit.

8 Claims, 6 Drawing Sheets

MOVING OBJECT IMAGE TRACKING APPARATUS AND METHOD

CROSS-REFERENCE TO RELATED APPLICATIONS

This application is based upon and claims the benefit of priority from prior Japanese Patent Application No. 2008-041872, filed Feb. 22, 2008, the entire contents of which are incorporated herein by reference.

BACKGROUND OF THE INVENTION

1. Field of the Invention

The present invention relates to a moving object image tracking apparatus and method for enabling a target recognition sensor, such as a camera, to track a target that can move in every direction.

2. Description of the Related Art

In recent years, systems for tracking an object using, for example, an ITV camera, to realize continued monitoring or acquire detailed information have been produced on a commercial basis for protective service equipment employed in major facilities such as airports and manufacturing plants, lifeline facilities such as electric power plants and water networks, and traffic information support systems such as ITSs. These systems include not only ground equipment type systems, but also compact ones installed in vehicles, ships or airplanes and having a vibration-proof structure. In the systems, it has come to be important to enhance their whirling speed to make them quickly point a plurality of targets and sequentially track the targets.

It is necessary for the above moving object image tracking systems to incorporate at least two axes in its gimbal structure in order to track a target that can move in every direction. In biaxial gimbals, when a target passes the zenith or a position near the same, it is necessary to instantly rotate the AZ axis of the gimbal structure through 180°. Actually, however, this quick rotation is hard to execute, and hence the phenomenon, called gimbal lock, which makes it impossible to continuously track an object will easily occur. Therefore, the biaxial gimbal structure cannot be oriented to the zenith and its vicinity, which makes it difficult to realize omnidirectional tracking.

In light of the above, in some conventional image tracking systems, a triaxial gimbal structure is employed to enhance the degree of freedom in tracking, and is attempted to be used to continuously track a target in all directions, with its azimuth axis (Az axis) and cross elevation axis (xEL axis) controlled so as not to excessively increase the angular velocity to thereby avoid gimbal lock and make the movement of the gimbal fall within an allowable range (see, for example, JP-A 2006-106910 (KOKAI)).

In these conventional techniques, the gimbal structure is more complex than the biaxial one and requires another driving means (such as a motor), because the number of gimbals employed is larger by one than the latter structure. Thus, the triaxial gimbal structure is hard to reduce in size and cost. Further, in the triaxial gimbal structure, since a camera, for example, is installed, a great load inertia is applied to the xEL axis, which may cause interference between the Az axis and the xEL axis, which is a problem peculiar to the triaxial gimbal structure.

Further, to enable the biaxial gimbal structure to execute tracking near the zenith, a motor of such a performance capability as allows an instant 180° movement of each gimbal is required. This is an excessive imposition on the tracking apparatus.

BRIEF SUMMARY OF THE INVENTION

In accordance with an aspect of the invention, there is provided a moving object image tracking apparatus comprising: a first rotation unit configured to rotate about an azimuth axis vertically oriented and rotatably supported; a second rotation unit configured to rotate about an elevation axis rotatably supported and horizontally oriented, the elevation axis being perpendicular to the azimuth axis; a driving unit configured to drive the first rotation unit and the second rotation unit to rotate independent of each other; an acquisition unit supported by the second rotation unit and configured to acquire image data of a moving object by photography; a first detection unit configured to detect, from the image data, a tracking error detection value indicating a tracking error as a deviation of the moving object from a center of a field of view of the acquisition unit; a second detection unit configured to detect a first angle indicating a first attitude of the first rotation unit; a third detection unit configured to detect a second angle indicating a second attitude of the second rotation unit; a first computation unit configured to compute a first angular velocity of the first rotation unit and a second angular velocity of the second rotation unit, using the tracking error detection value and the first angle and the second angle; a determination unit configured to determine whether the moving object falls within a correction range, referring to the second angle, the correction range being defined by a correction range angle threshold value set with respect to a zenith; a second computation unit configured to compute a moving velocity of the moving object by executing temporal differentiation on the first angle and the second angle; a third computation unit configured to compute a period of time in which the moving object falls within the correction range, based on the correction range angle threshold value and the moving velocity; a fourth detection unit configured to detect, as an approach angle, the first angle assumed when the moving object enters the correction range; a setting unit configured to set the first angular velocity and the second angular velocity as angular velocity instruction values for the first rotation unit and the second rotation unit when it is determined that the moving object falls outside the correction range, and configured to set the second angular velocity and a third angular velocity as the angular velocity instruction values when it is determined that the moving object falls within the correction range, the third angular velocity being obtained by dividing the approach angle by the period of time, the third angular velocity being used to rotate the first rotation unit toward a zero axis along which the moving object approaches the acquisition unit; a fifth detection unit configured to detect a fourth angular velocity and a fifth angular velocity of the first rotation unit and the second rotation unit, respectively; and a control unit configured to control the driving unit to eliminate a difference between the fourth angular velocity and an angular velocity indicated by one of the angular velocity instruction values corresponding to the first rotation unit, and configured to control the driving unit to eliminate a difference between the fifth angular velocity and an angular velocity indicated by another one of the angular velocity instruction values corresponding to the second rotation unit.

In accordance with another aspect of the invention, there is provided a moving object image tracking apparatus comprising: a first rotation unit configured to rotate about an azimuth axis vertically oriented and rotatably supported; a second rotation unit configured to rotate about an elevation axis rotatably supported and horizontally oriented, the elevation axis being perpendicular to the azimuth axis; a driving unit configured to drive the first rotation unit and the second rotation unit to rotate independent of each other; an acquisition unit supported by the second rotation unit and configured to acquire image data of a moving object by photography; a first detection unit configured to detect, from the image data, a tracking error detection value indicating a tracking error as a deviation of the moving object from a center of a field of view of the acquisition unit; a second detection unit configured to detect a first angle indicating a first attitude of the first rotation unit; a third detection unit configured to detect a second angle indicating a second attitude of the second rotation unit; a first computation unit configured to compute a first angular velocity of the first rotation unit and a second angular velocity of the second rotation unit, using the tracking error detection value and the first angle and the second angle; a determination unit configured to determine, referring to the second angle, whether the moving object falls within a correction range and whether the moving object has passed the zenith, the correction range being defined by a correction range angle threshold value set with respect to a zenith; a second computation unit configured to compute a moving velocity of the moving object by executing temporal differentiation on the first angle and the second angle; a third computation unit configured to compute a period of time in which the moving object falls within the correction range, based on the correction range angle threshold value and the moving velocity; a fourth detection unit configured to detect, as an approach angle, the first angle assumed when the moving object enters the correction range; a setting unit configured to set the first angular velocity and the second angular velocity as angular velocity instruction values for the first rotation unit and the second rotation unit when it is determined that the moving object falls outside the correction range, or when it is determined that the moving object falls within the correction range and has passed the zenith, and configured to set the second angular velocity and a third angular velocity as the angular velocity instruction values when it is determined that the moving object falls within the correction range and has not yet passed the zenith, the third angular velocity being obtained by dividing the approach angle by the period of time, the third angular velocity being used to rotate the first rotation unit toward a zero axis along which the moving object approaches the acquisition unit; a fifth detection unit configured to detect a fourth angular velocity and a fifth angular velocity of the first rotation unit and the second rotation unit, respectively; and a control unit configured to control the driving unit to eliminate a difference between the fourth angular velocity and an angular velocity indicated by one of the angular velocity instruction values corresponding to the first rotation unit, and configured to control the driving unit to eliminate a difference between the fifth angular velocity and an angular velocity indicated by another one of the angular velocity instruction values corresponding to the second rotation unit.

DETAILED DESCRIPTION OF THE INVENTION

Referring now to the accompanying drawings, a moving object image tracking apparatus and methods according to embodiments of the invention will be described in detail. In the embodiment described below, like reference numbers denote like elements, and no duplication of description is made.

The moving object image tracking apparatus employed in the embodiments is obtained by applying a control system for a moving object image tracking mechanism to an image tracking system.

The moving object image tracking apparatuses and methods of the embodiments can improve degradation of the tracking performance of a biaxial gimbal structure without adding any additional sensor.

(First Embodiment)

Figure 1:
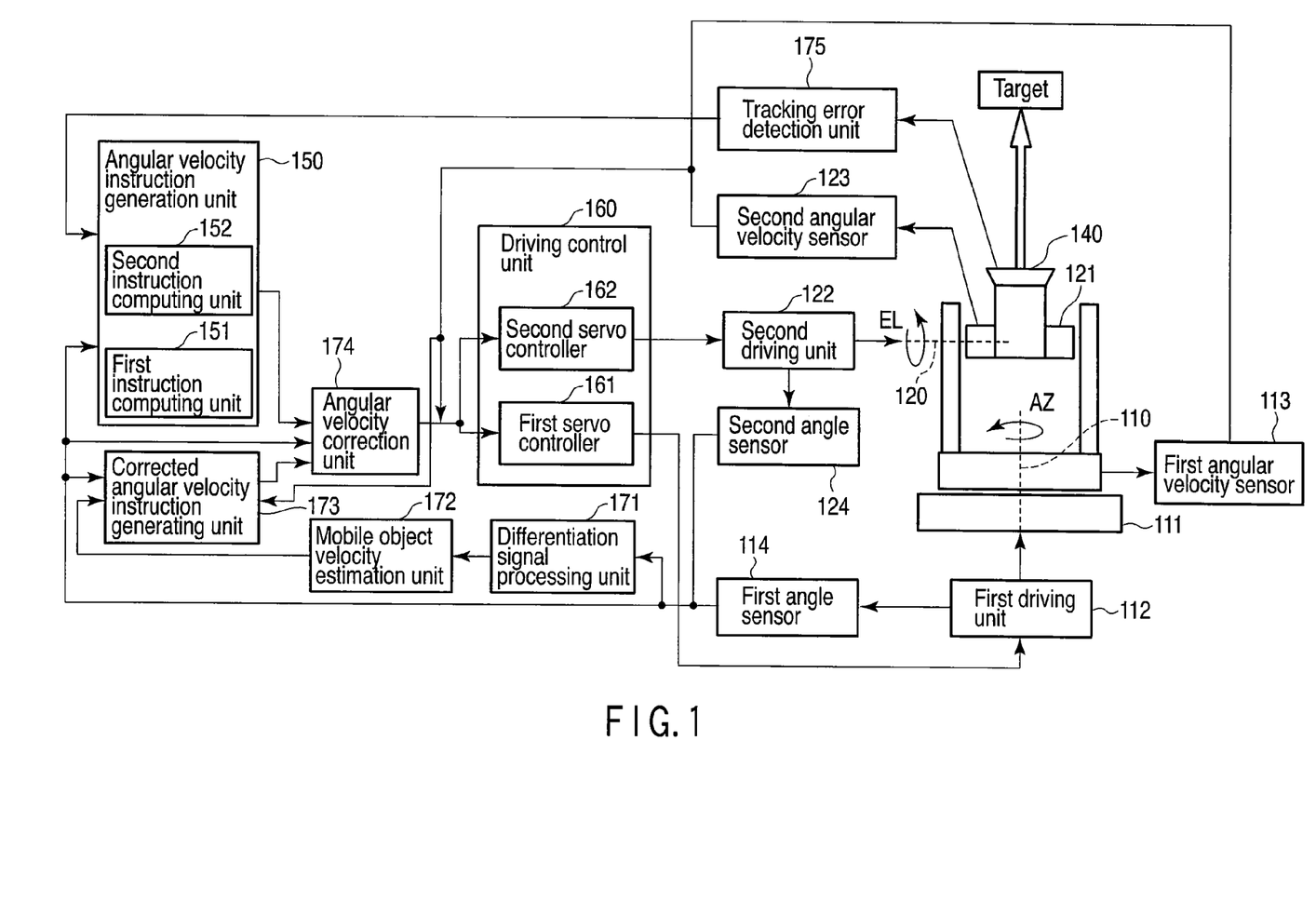
FIG. 1 is a block diagram illustrating a moving object image tracking apparatus employed in embodiments of the invention.

Referring to FIG. 1, a description will be given of a moving object image tracking apparatus according to a first embodiment.

The moving object image tracking apparatus comprises first and second gimbals 111 and 121, first and second driving units 112 and 122, first and second angular velocity sensors 113 and 123, first and second angle sensors 114 and 124, a camera sensor 140, an angular velocity instruction generating unit 150, a driving control unit 160, a differentiation signal processing unit 171, a moving object velocity estimation unit 172, a corrected angular velocity instruction generating unit 173, an angular velocity correction unit 174 and a tracking error detection unit 175.

The angular velocity instruction generating unit 150 includes first and second instruction computing units 151 and 152. The driving control unit 160 includes first and second servo controllers 161 and 162.

The first gimbal 111 rotates about a first gimbal axis 110 that is a vertically oriented and rotatably supported azimuth axis. The second gimbal 121 rotates about a second gimbal axis 120 that is a rotatably supported elevation axis horizontally oriented, i.e., set perpendicular to the azimuth axis. The first and second driving units 112 and 122 rotate the first and second gimbals 111 and 121, respectively.

The first angular velocity sensor 113 detects the angular velocity of the first gimbal 111 that rotates about the first gimbal axis 110. The second angular velocity sensor 123 detects the angular velocity of the second gimbal 121 that rotates about the second gimbal axis 120.

The first angle sensor 114 detects the angle of rotation of the first gimbal 111 with respect to a gimbal fixing unit (not shown). The second angle sensor 124 detects the angle of rotation of the second gimbal 121 with respect to the first gimbal 111.

The camera sensor 140 is supported by the second gimbal 121 and used to detect a moving object and produce image data thereof.

The tracking error detection unit 175 performs image processing on image data obtained from the camera sensor 140, to detect a tracking error. In general, the tracking error detection unit 175 digitizes the image data to obtain monochrome image data, extracts the characterizing point of the moving object to determine the position thereof in the field of view of the camera, and detects two-directional displacements (ΔX, ΔY) from the center of the field of view, as tracking error detection values. The time required for the above process including image processing is regarded as a sampling time for obtaining tracking error detection values. The tracking error detection values will be described later with reference to FIG. 4.

The angular velocity instruction generating unit 150 generates angular velocity instruction values for driving the gimbals to track a moving object, based on the two-directional tracking errors obtained from the tracking error detection unit 175, and the angle detection values ($\theta_1$, $\theta_2$) of the two axes, which indicate the attitudes of the gimbals and are detected by the first and second angle sensors 114 and 124. This process will be described later in detail with reference to FIG. 3.

The first instruction computing unit 151 computes a first angular velocity instruction value for driving the first gimbal 111 during target tracking, based on two-directional tracking errors acquired from the tracking error detection unit 175 and angle data acquired from the first and second angle sensors 114 and 124. The second instruction computing unit 152 computes a second angular velocity instruction value for driving the second gimbal 121 during target tracking, based on two-directional tracking errors acquired from the tracking error detection unit 175 and angle data acquired from the first and second angle sensors 114 and 124.

The driving control unit 160 computes a control value for making zero the difference between each angular velocity instruction value generated by the angular velocity correction unit 174, and the corresponding one of the angular velocities detected by the first and second angular velocity sensors 113 and 123. The first and second servo controllers 161 and 162 correspond to the first and second angular velocity sensors 113 and 123, respectively, and output control values to the first and second driving units 112 and 122, respectively.

The differentiation signal processing unit 171 receives data on the angles detected by the first and second angle sensors 114 and 124, and performs temporal differentiation on the angle data to compute the angular velocities of the first and second gimbals.

The moving object velocity estimation unit 172 receives, from differentiation signal processing unit 171, data on angular velocities corresponding to the angles detected by the first and second angle sensors 114 and 124, to thereby detect the velocity of a moving object.

The corrected angular velocity instruction generating unit 173 receives the moving object velocity data from the moving object velocity estimation unit 172, and also receives detected angle data from the first and second angle sensors 114 and 124, thereby generating a corrected angular velocity instruction value for the first gimbal 111. The corrected angular velocity instruction value enables the first gimbal 111 to correct the attitude of the camera sensor 140 so as to avoid gimbal lock and cause the visual axis of the camera sensor 140 to pass the zenith. The corrected angular velocity instruction generating unit 173 will be described later with reference to FIG. 3.

The angular velocity correction unit 174 receives the angular velocity instruction values of the angular velocity instruction generating unit 150, the corrected angular velocity instruction value generated by the corrected angular velocity instruction generating unit 173, and data on the angles detected by the angle sensors 114 and 124, thereby determining whether the gimbals are oriented toward positions near the zenith. Based on the determination result, the angular velocity correction unit 174 selects the angular velocity instruction value for the first gimbal 111 output from the angular velocity instruction generating unit 150, or the corrected angular velocity instruction value for the first gimbal 111 output from the corrected angular velocity instruction generating unit 173. The second gimbal 121 is always operated by the angular velocity instruction value output from the angular velocity instruction generating unit 150. The angular velocity correction unit 174 will be described later with reference to FIG. 3.

Figure 2:
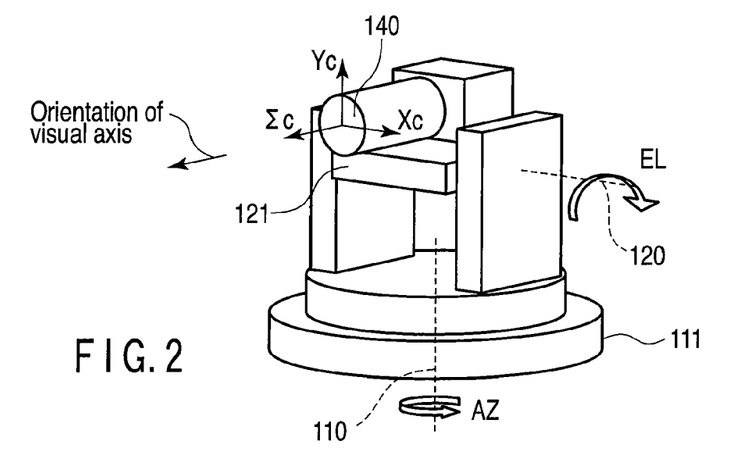
FIG. 2 is a schematic perspective view illustrating first and second gimbals and the camera sensor incorporated in the apparatus of FIG. 1.

Referring to FIG. 2, the camera sensor used in the embodiment will be described.

The first gimbal axis 110 is an azimuth axis (hereinafter referred to simply as the "Az axis"), and the second gimbal axis 120 is an elevation axis (hereinafter referred to simply as the "EL axis"). The moving object image tracking apparatus shown in FIG. 1 is a biaxial rotary apparatus having a biaxial structure in which the Az axis 110 and EL axis 120 intersect at one point.

Figure 3:
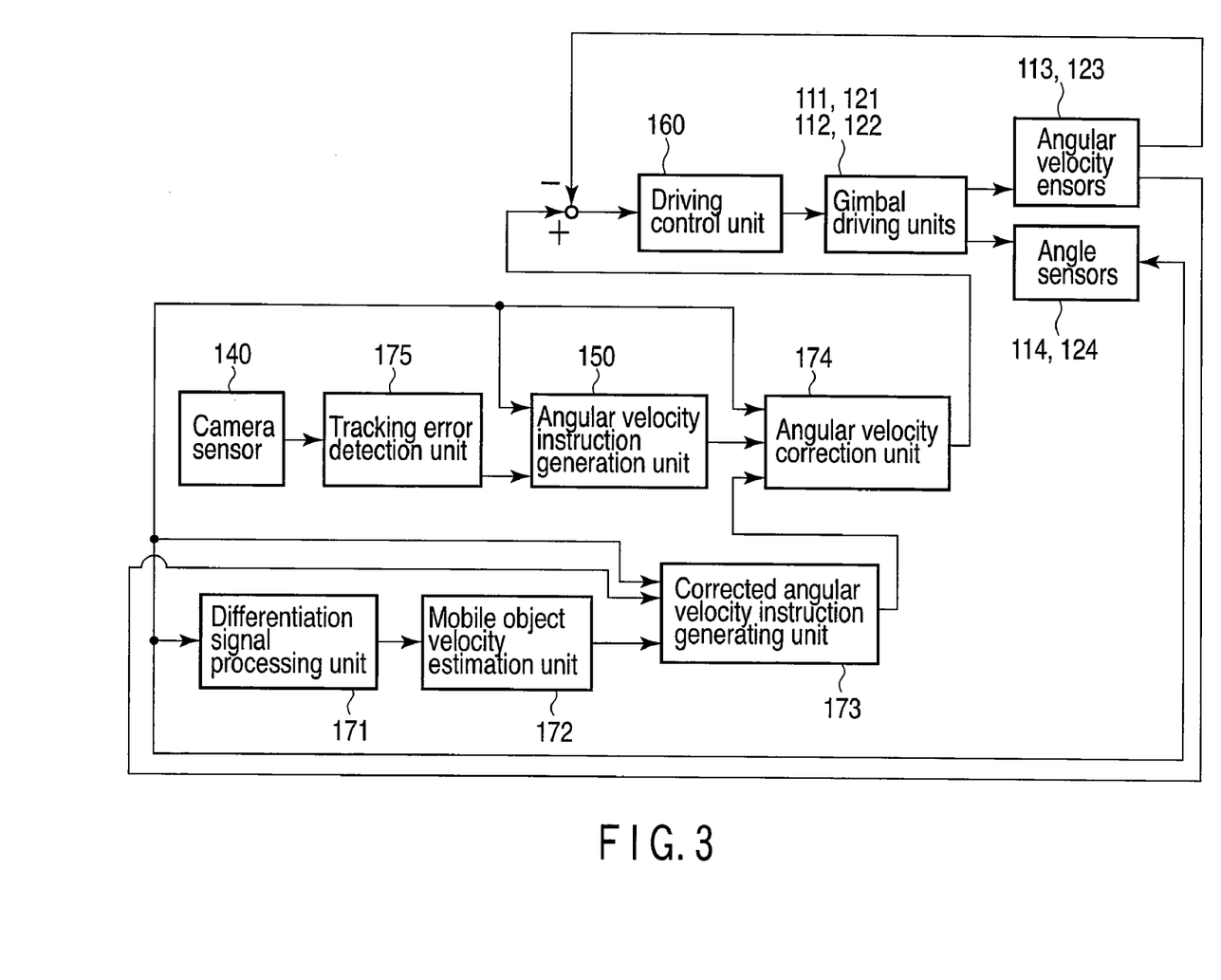
FIG. 3 is a block diagram illustrating the correction control system shown in FIG. 1.

Referring then to FIG. 3, a description will be given of a correction control system incorporated in the moving object image tracking apparatus of the embodiment. FIG. 3 is a block diagram illustrating a control block related to the two axes, i.e., the Az axis and EL axis.

The angular velocity instruction generating unit 150 generates such angular velocity instruction values as given below for driving the gimbals to track a moving object, based on two-directional tracking error detection values (ΔX, ΔY) acquired from the tracking error detection unit 175, and based on angular detection values ($\theta_1$, $\theta_2$) for the two axes detected by the first and second angle sensors 114 and 124 and indicating the attitudes of the gimbals:

$$\dot{\theta}r1, \dot{\theta}r2$$

A method of providing the two gimbals with angular velocities based on the two-directional tracking error detection values (ΔX, ΔY) is given by, for example, the following relational expression concerning angular velocity instruction values for the tracking error detection values and angle detection values:

$$\begin{bmatrix} \dot{\theta}r1 \\ \dot{\theta}r2 \end{bmatrix} = k \begin{bmatrix} -\sec\theta_2 & 0 \\ 0 & 1 \end{bmatrix} \begin{bmatrix} \Delta X \\ \Delta Y \end{bmatrix}$$

where sec θ is a secant function, and is infinite when θ is 90°. Accordingly, an instruction indicating a very large angular velocity is inevitably issued for the first gimbal at or near the zenith, which causes gimbal lock.

In the correction control system of the embodiment, during performing tracking in the field of view of the camera sensor, a tracking error detection value is acquired from the camera sensor 140, and the moving object velocity estimation unit 172 estimates the velocity of a moving object based on gimbal angle data acquired from the angle sensors 114 ands 124. The estimation of the moving object velocity is executed using the following relational expression concerning moving object velocity $\omega_t$ relative to the gimbal angular velocities:

$$\omega_t = \sqrt{\dot{\theta}_1^2 + \dot{\theta}_2^2}$$

The above expression requires angular velocities unique to the gimbals. Therefore, although angular-velocity dimension data is acquired by the first and second angular velocity sensors 113 and 123, it is not advisable to use, in the above expression, the values output from the angular velocity sensors 113 and 123, since the values may be varied by another element and the angular velocity sensors are limited in detection range. In the embodiment, the differentiation signal processing unit 171 computes angular velocities by executing temporal differentiation on data corresponding to detected angles, and the moving object velocity estimation unit 172 uses the computed values. This can eliminate the adverse influences of the angular velocity sensors 113 and 123. It is desirable that the differentiation signal processing unit 171 execute signal processing having differentiation and lowpass characteristics in view of an increase in high-frequency component due to differentiation. Thus, the moving object velocity estimation unit 172 can acquire a moving object velocity estimation value.

The corrected angular velocity instruction generating unit 173 generates a corrected angular velocity instruction, using the thus-determined moving object velocity estimation value $\omega_t$. The corrected angular velocity instruction generating unit 173 holds, as $\theta_i$ and $\omega_i$, the angle (also called an approach angle) and angular velocity (also called an entry angular velocity) of the first gimbal 111 assumed when angle $\theta_2$ satisfies the following expression with respect to correction angle range threshold value $\theta_{2t}$ for setting a correction range in which the corrected angular velocity instruction is used:

$$\theta_2 \geq 90 - \theta_{2t}$$

The correction angle range threshold value $\theta_{2t}$ is determined from the difference between the elevation angle assumed when the second gimbal 121 is oriented to the zenith, and a maximum elevation angle that can be tracked using an angular velocity instruction value computed based on the angles of the two axes and the tracking error detection value. Based on the relationship between the moving object velocity estimation value and a remaining angle with respect to the zenith, zenith arrival remaining time $t_{rem}$ is give by $$t_{rem} = \frac{90 - \theta_{2t}}{\omega_t}$$

To avoid gimbal lock near the zenith due to an excessive angular velocity instruction value, a corrected orbit on which the visual axis of the camera sensor passes is imparted when the visual axis passes near the zenith. Since this orbit is imparted to move the visual axis toward the zenith when the visual axis falls within the zenith range, the corrected angular velocity instruction value for the first gimbal 111 is given by $$\dot{\theta}'_{r1} = -\frac{\theta_i}{t_{rem}}$$

Using the thus-determined corrected angular velocity instruction value for the first gimbal 111, the angular velocity correction unit 174 corrects an angular velocity instruction generated for a position near the zenith. Specifically, the angular velocity correction unit 174 determines whether the generated angular velocity instruction value falls within the correction range. If it falls outside the correction range, the angular velocity correction unit 174 uses the following angular velocity instruction value that is generated by the angular velocity instruction generating unit 150 based on the tracking error detection value detected by the tracking error detection unit 175 using an image acquired from the camera sensor 140:

θr1

If the angular velocity instruction value falls within the correction range, the angular velocity correction unit 174 uses the following corrected angular velocity instruction value based on the moving object velocity estimation value:

θ'r1

In the case of the second gimbal 121, since no excessive angular velocity instruction value is generated, the following angular velocity instruction value is used without any correction:

θr2

The driving control unit 160 computes control instruction values that each make, zero, the difference between the corresponding one of the angular velocity detection values detected by the first and second angular velocity sensors 113 and 123, and the corresponding one of the angular velocity instruction values that correspond to the angular velocity sensors 113 and 123 and are generated by the angular velocity correction unit 174. Based on the computed control instruction values, the driving control unit 160 drives the gimbal structure to track the moving object. The gimbal structure includes the first and second gimbals 111 and 121 and first and second driving units 112 and 122.

The moving object image tracking apparatus operates as mentioned above, and hence generates no excessive angular velocity instruction values for positions near the zenith. Namely, it can generate angular velocity instruction values that enable appropriate tracking control even near the zenith.

Figure 4:
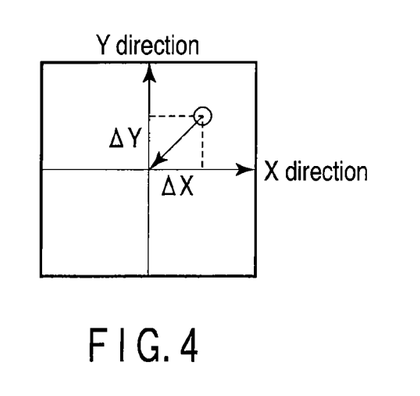
FIG. 4 is a schematic view useful in explaining tracking of a moving object using the field of view of the camera sensor shown in FIG. 1.

Referring now to FIG. 4, a description will be given of an image acquired by the camera sensor (i.e., an image falling within the field of view of the camera sensor), and moving object tracking.

FIG. 4 schematically illustrates the field of view of the camera sensor and the way of tracking of a moving object. When the moving object falls within the field of view of the camera sensor, two-directional tracking error detection values ($\Delta X$, $\Delta Y$) as deviations from the center of the field of view of the camera sensor. Because of tracking delay, the tracking error detection values that fall outside the field of view of the camera sensor are not allowed. It is desirable that the tracking error be small. However, as far as the tracking error falls within the field of view of the camera sensor even if it is large, the biaxial gimbal structure can track the moving object.

Figure 5:
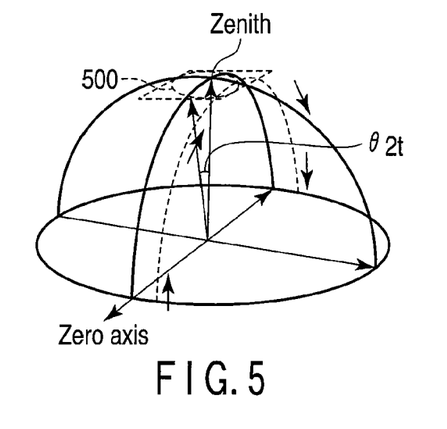
FIG. 5 is a view illustrating the orbit of a moving object, and that of the visual axis of a camera sensor obtained by driving the camera sensor based on a corrected angular velocity instruction.
Figure 6:
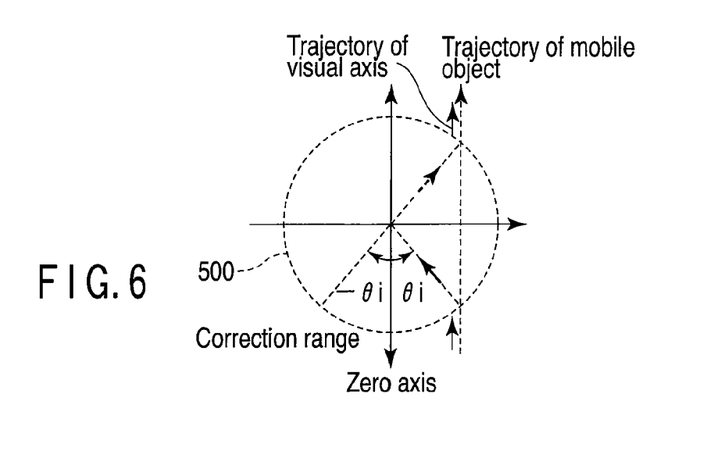
FIG. 6 is an enlarged view of area 500, shown in FIG. 5, located near a zenith correction range.

Referring then to FIGS. 5 and 6, a description will be given of correction of an angular velocity instruction performed when the visual axis of the camera sensor moves away from the zenith.

FIG. 5 schematically shows the orbit of the moving object and the orbit of the visual axis of the camera sensor obtained by corrected angular velocity control. If the orbits are expressed three-dimensionally, it can be understood that the biaxial gimbal structure can orient the visual axis in all directions over the entire hemispheric region. Consideration will now be given to a typical example in which a moving object moves from the front side of the tracking apparatus to the rear side, taking a route slightly deviated from an arc that passes through the zenith. In FIG. 5, the above-described correction process is applied to a correction range 500 defined by the correction angle range threshold value $\theta_{2t}$ with respect to the zenith. Further, in FIG. 5, the axis along which the three-dimensional orbit of the moving object is projected is called a "zero axis."

FIG. 6 is an enlarged view illustrating the correction range 500 of FIG. 5 as a two-dimensional plane. In FIG. 6, the moving object is moving upward. When the camera sensor is tracking the moving object from below (in FIG. 5) and the visual axis of the camera sensor enters the correction range, the driving control unit 160 holds the angle and angular velocity of the first gimbal 111 as $\theta_i$ and $\omega_i$, respectively, and drives the first gimbal 111 using a corrected angular velocity instruction value. In this case, to orient the visual axis toward the zenith, the driving control unit 160 orients the first gimbal 111 toward the zero axis by $\theta_i$ (as a result, the angle of the first gimbal 111 becomes zero), and makes the second gimbal 121 upright. In the embodiment, after the visual axis reaches the zenith, it is oriented opposite, with respect to the zenith, to the orientation of the visual axis assumed when it enters the correction range (at this time, the angle of the first gimbal 111 is $-\theta_i$ with respect to the zero axis). This means that the first gimbal 111 is made to shift by $\theta_i$ from the zero axis by a corrected angle velocity instruction value, and therefore means that an orbit for shifting the first gimbal 111 by $-\theta_i$ from the zero axis in the same shift time as the time used to shift the same by $\theta_i$ is imparted to the visual axis of the camera sensor. Accordingly, the corrected angular velocity instruction value used to orient the visual axis toward the zenith can be also used after the visual axis reaches the zenith. When the angle $\theta_2$ of the second gimbal 121 satisfies the following expression, the angular velocity correction unit 174 switches to-be-used angular velocity instruction values from the angular velocity instruction values (including the corrected angular velocity instruction value) for the correction range, to angular velocity instruction values computed by the angular velocity instruction generating unit 150 based on tracking error detection values detected by the tracking error detection unit 175, thereby enabling tracking to be continued even after the visual axis departs from the zenith:

$$\theta_2 \geq 90 + \theta_{2t}$$

Figure 7:
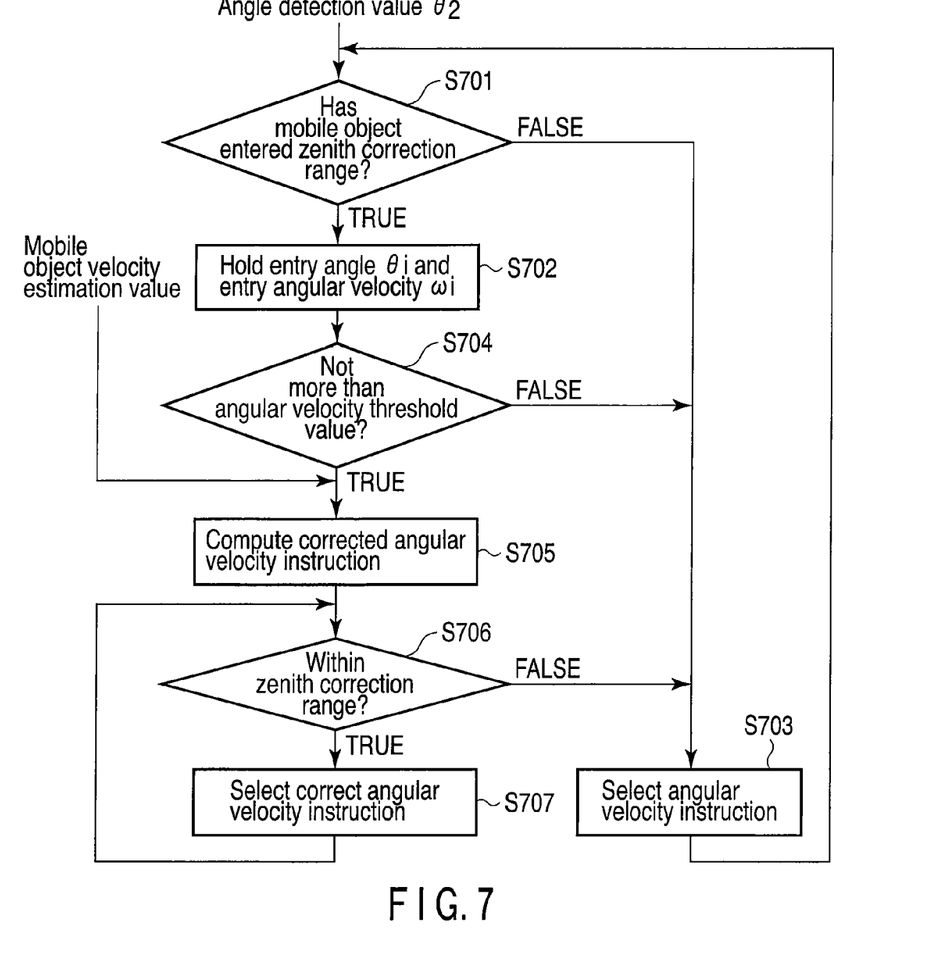
FIG. 7 is a flowchart illustrating operation examples, employed in a first embodiment, of the corrected angular velocity instruction generating unit and angular velocity correction unit shown in FIG. 1.

Referring then to FIG. 7, operation examples of the corrected angular velocity instruction generating unit 173 and the angular velocity correction unit 174 will be described.

The corrected angular velocity instruction generating unit 173 determines whether a target (moving object) enters the zenith correction range, based on the angle of the second gimbal 121 detected by the angle sensor 124 (step S701). If it is determined that the target does not enter the range, the angular velocity correction unit 174 selects the angular velocity instruction values of the angular velocity instruction generating unit 150, and transfers the selected values to the driving control unit 160 (step S703). At step S703, the angular velocity correction unit 174 determines whether the target exists within the zenith correction range. The determinations at steps S701 and S703 are executed using the same algorithm.

In contrast, if it is determined at step S701 that the target has entered the correction range, the corrected angular velocity instruction generating unit 173 holds data on the approach angle of the first gimbal 111 acquired from the angle sensor 114, and data on the entry angular velocity of the first gimbal 111 acquired from the angular velocity sensor 113 (step S702), and determines whether the held angular velocity is not more than a certain threshold value (step S704). If it is determined that the held angular velocity is not more than the certain threshold value, the corrected angular velocity instruction generating unit 173 acquires a moving object velocity estimation value from the moving object velocity estimation unit 172, thereby computing an angular velocity instruction value (step S705). In contrast, if it is determined that the held angular velocity is more than the certain threshold value, the angular velocity correction unit 174 selects the angular velocity instruction values of the angular velocity instruction generating unit 150 (step S703). As a result, even within the zenith correction range, execution of correction can be limited when the first gimbal 111 rotates at high speed.

The angular velocity correction unit 174 determines whether the target falls within the zenith correction range (step S706). If it is determined that the target falls within the zenith correction range, and if the angular velocity of the first gimbal 111 is not more than the threshold value, the angular velocity correction unit 174 selects the corrected angular velocity instruction value computed at step S705, and transfers the selected value to the driving control unit 160 (step S707). After executing step S707, the angular velocity correction unit 174 returns to step S706. Step S706 is executed, for example, at an interval of a preset time. When driving is executed using the corrected angular velocity instruction value, if it is determined at step S706 that the target falls outside the zenith correction range, the angular velocity correction unit 174 selects the angular velocity instruction values of the angular velocity instruction generating unit 150 at step S703, and returns to step S701 where it is determined whether the target enters the zenith correction range.

Figure 8:
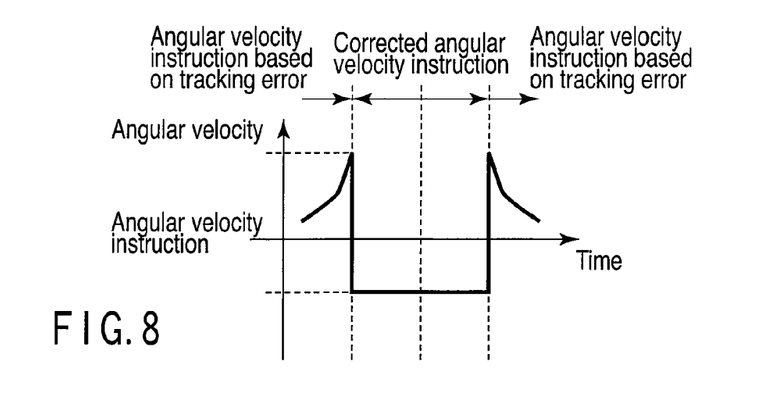
FIG. 8 is a view illustrating a temporal history of the angular velocity of the first gimbal that reflects whether the visual axis of the camera sensor falls within the zenith correction range.

Referring then to FIG. 8, a description will be given of variations with time in angular velocity that occur when the angular velocity correction unit 174 outputs either angular velocity instruction values based on tracking errors or a corrected angular velocity instruction, depending upon whether the target falls within the zenith correction range.

If the target falls outside the zenith correction range, the angular velocity correction unit 174 selects angular velocity instruction values based on the tracking error detection values ($\Delta X$, $\Delta Y$), thereby rotating the first gimbal 111 to enable the driving control unit 160 to track the target. When the target enters the zenith correction range, the angular velocity correction unit 174 selects a corrected angular velocity instruction. If the target falls within the zenith correction range when the first gimbal 111 has rotated through $\theta_i$, a corrected angular velocity instruction value for shifting the angle $\theta_i$ to the zero axis and further rotating the gimbal 111 to $-\theta_i$ is output. Namely, for a time period of $2\theta_{2t}/\omega_t$, the first gimbal 111 rotates at the angular velocity indicated by the corrected angular velocity instruction value. After that, when the target falls outside the zenith correction range, angular velocity instruction values based on the tracking error detection values are output again.

Figure 9:
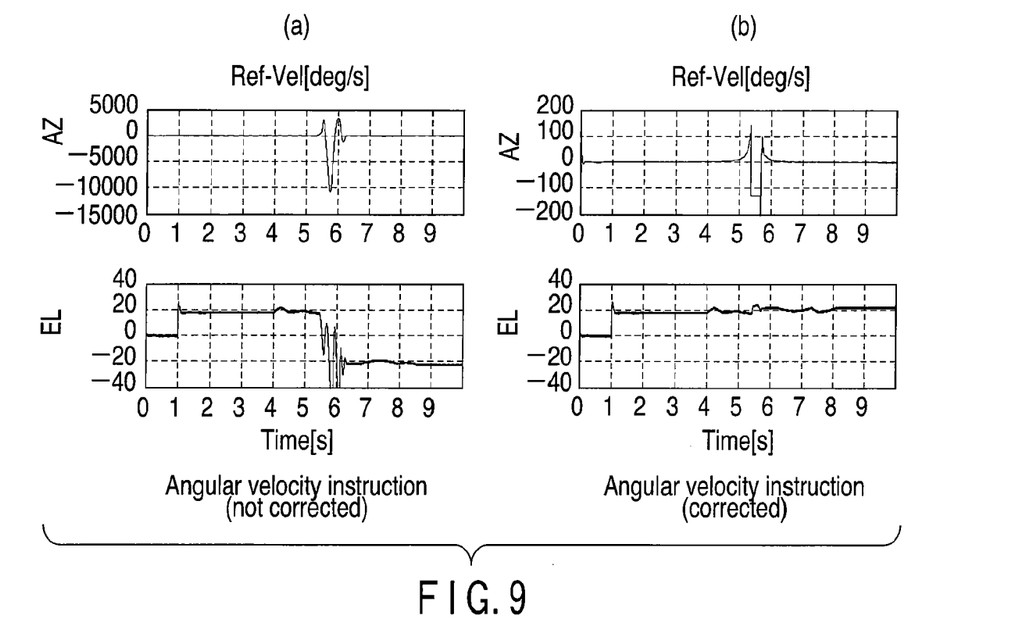
FIG. 9 is a view illustrating temporal histories of the angular velocities of the first and second gimbals, which vary depending upon whether correction is performed.
Figure 10:
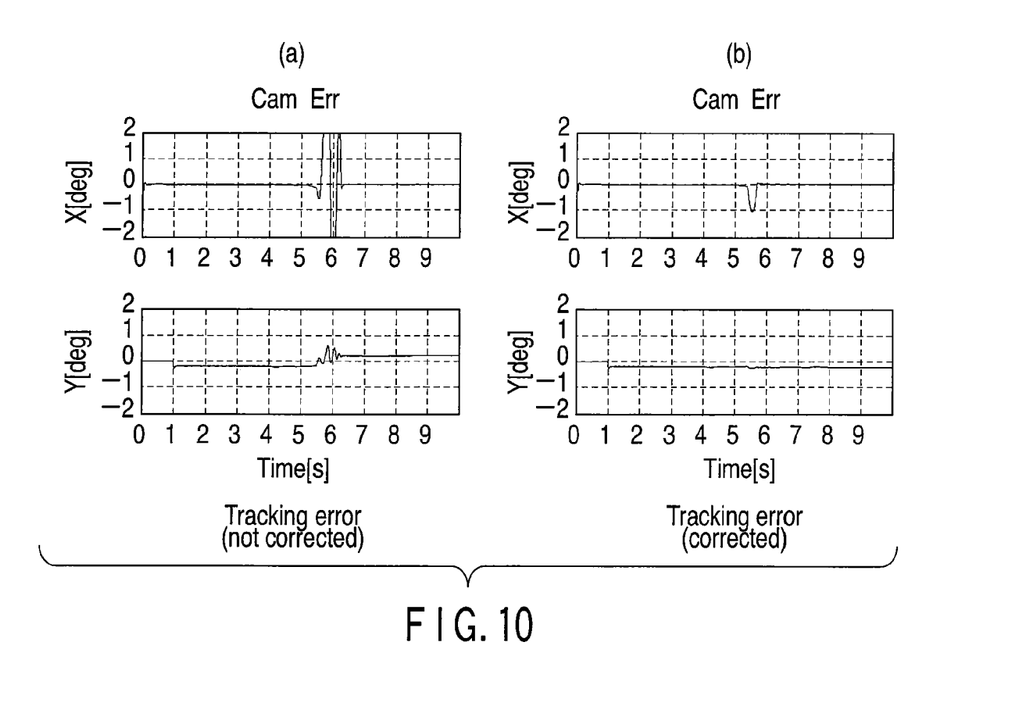
FIG. 10 is a view illustrating temporal histories of the x- and y-components of detected tracking errors, which vary depending upon whether correction is performed.

Referring now to FIGS. 9 and 10, a description will be given of examples of variations in tracking error, which occur when a moving object moves from the front side of the tracking apparatus to the rear side, taking a route slightly deviated from an arc of the hemisphere of FIG. 5 passing through the zenith, and which depend upon whether correction control is executed by the moving object image tracking apparatus of the embodiment.

When the moving object passes near the zenith, it is strongly possible that the tracking performance of the gimbals will be degraded because of the limitations of the gimbal driving characteristics, since the Az axis of the first gimbal must be greatly rotated from an attitude almost perpendicular to the zenith, to an attitude almost parallel to the zenith, as the visual axis of the camera sensor approaches the zenith.

FIG. 9 shows, in relation to time, angular velocity instruction values given to the driving control unit 160 for controlling the first and second gimbals 111 and 121. The first gimbal corresponds to Az, and the second gimbal corresponds to EL. Where there is no correction (in the case of FIG. 9(a)), extremely high angular velocity instruction values are imparted near the zenith (at a time of approx. 5.5 (s)). In this case, however, the gimbals cannot follow the values because of the limitations of the gimbal driving characteristics. In contrast, where correction has been made (in the case of FIG. 9(b)), angular velocity instruction values that can sufficiently be followed by the gimbal driving characteristics are imparted. When correction has been made, the Az axis is driven, near the zenith, by a preset angular velocity instruction value so that the camera sensor can track the moving object that moves from the front side of the tracking apparatus to the rear side, passing the zenith. When tracking the object having passed the zenith, the camera sensor is driven to orient toward the zenith. On the other hand, the EL axis is driven at substantially the same angular velocity so that it tracks the moving object moving from the front side of the tracking apparatus to the rear side, with its angle changed from 0° to 180°.

FIG. 10 shows, in relation to time, the x-component values and y-component values of the camera tracking error detection values. When no correction is made (FIG. 10(a)), very high angular velocity instruction values are output, and hence there are great variations in tracking error detection value because of the limits of the gimbal driving characteristics. In contrast, when correction is made (FIG. 10(b)), the moving object is tracked with small variations in tracking error detection value. Although the maximum tracking error detection value is found near the zenith at the time of approx. 5.5 (s), it sufficiently falls within the field of view of the camera sensor. Thus, reliable tracking is realized.

In the above-described first embodiment, gimbal lock due to excessive angular velocity instruction values near the zenith can be avoided by performing correction control in the zenith correction range, with the result that appropriate angular velocity instruction values for moving object tracking can be generated to thereby improve the tracking characteristics of the gimbal structure.

(Second Embodiment)

In the correction control system of a moving object image tracking apparatus according to a second embodiment, angular velocity instruction values based on tracking error detection values, which are detected by the tracing error detection unit 175 based on an image acquired from the camera sensor 140, are used as angular velocity instruction values applied when the visual axis of the camera sensor moves away from the zenith. The structure of the moving object image tracking apparatus according to the second embodiment is the same as that employed in the first embodiment.

Figure 11:
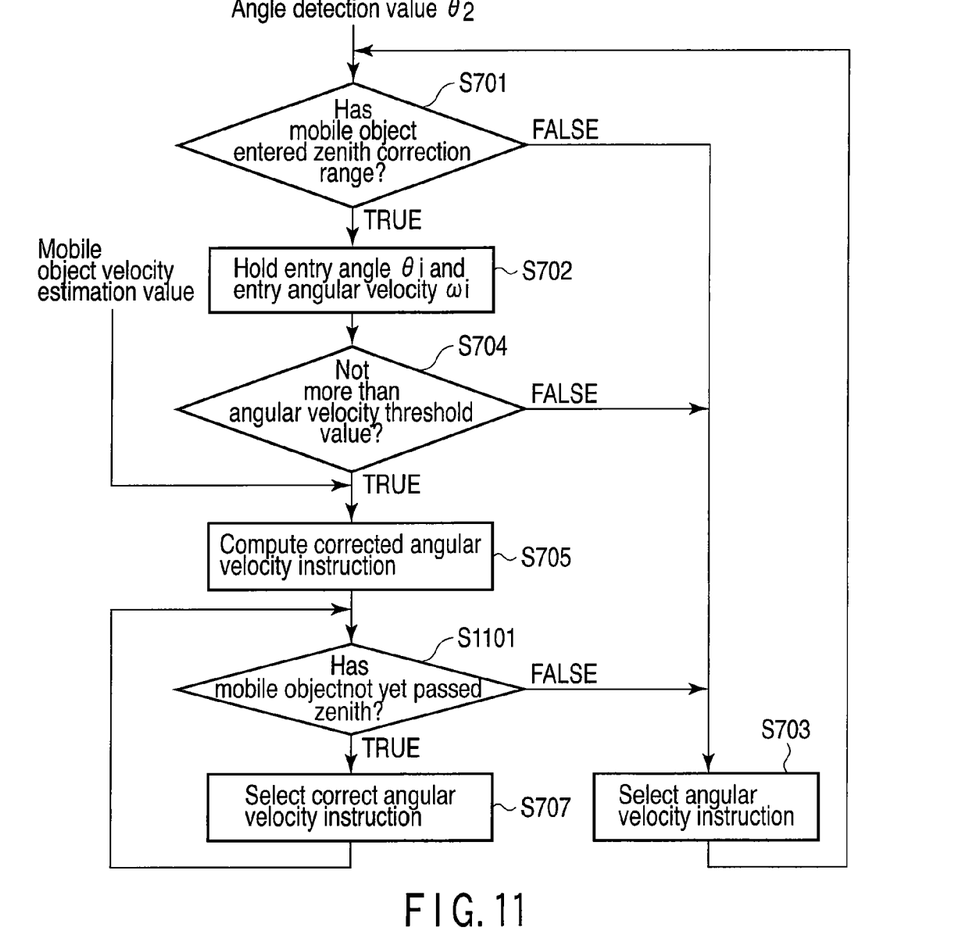
FIG. 11 is a flowchart illustrating operation examples, employed in a second embodiment, of the corrected angular velocity instruction generating unit and angular velocity correction unit shown in FIG. 1.

Referring to FIG. 11, operation examples of the corrected angular velocity instruction generating unit 173 and the angular velocity correction unit 174, performed in the second embodiment, will be described. Since these units perform the same operations as those of the first embodiment until the visual axis of the camera sensor reaches the zenith, no description is given of the operations performed until that time.

When it is determined that a moving object has entered the correction range, the corrected angular velocity instruction generating unit 173 holds data on the approach angle and entry angular velocity, acquires a moving object velocity estimation value from the moving object velocity estimation unit 172, and computes a corrected angular velocity instruction (step S705). The angular velocity correction unit 174 determines whether the moving object has not yet passed through the zenith (step S1101). If it is determined at step S1101 that the moving object has not yet passed through the zenith, the angular velocity correction unit 174 selects the corrected angular velocity instruction and transfers it to the driving control unit 160 (step S707). After that, step S1101 is executed again, as in the first embodiment. If it is determined that the moving object has passed the zenith, i.e., if it is determined that the moving object has shifted from a state in which it is tracked by the corrected angular velocity instruction, to a state in which it is to be tracked by the angular velocity instruction values of the angular velocity instruction generating unit 150, the angular velocity correction unit 174 selects the angular velocity instruction values of the angular velocity instruction generating unit 150, and transfers them to the driving control unit 160 (step S703). After that, the program returns to step S701.

When the moving object passes the zenith, a maximum tracking error occurs in the X component, and an extremely high angular velocity instruction value is output for the first gimbal 111. At this time, although the first gimbal cannot follow the angular velocity instruction value because of the limitations of the gimbal driving characteristics, it is driven at a maximum angular velocity to reduce the tracking error. Namely, where no correction is made, a maximum angular velocity instruction value for making the first gimbal 111 quickly rotate from the front side of the tracking apparatus to the rear side is given to the first gimbal 111 in a relatively long time. In contrast, where correction is made, a maximum angular velocity instruction value for reducing the tracking error is given to the first gimbal 111 in a short time. This means short-time driving executed at a maximum capacity for reducing the tracking error. As a result, the load on the gimbal structure is reduced, and the time required for eliminating the tracking error is shortened. Concerning the second gimbal 121, since the zenith has already been passed, the EL axis is rotated from 0° to 180° to track the moving object moving from the front side of the tracking apparatus to the rear side.

In the above-described second embodiment, when the moving object exists in the zenith correction range and has not yet passed through the zenith, correction control is performed. This enables gimbal lock due to excessive angular velocity instruction values generated for a position near the zenith to be avoided, an appropriate angular velocity instruction to be generated for tracking the moving object, and the tracking characteristics to be improved.

(Third Embodiment)

In the correction control system of a moving object image tracking apparatus according to a third embodiment, the angular velocities of the gimbals are gradually varied during the time when a target enters the zenith correction range, reaches the zenith, and departs from the zenith correction range. The structure of the moving object image tracking apparatus according to the third embodiment is the same as that employed in the first embodiment.

The corrected angular velocity instruction generating unit 173 generates a corrected angular velocity instruction using the moving object velocity estimation value $\omega_t$. The corrected angular velocity instruction generating unit 173 holds, as $\theta_i$ and $\omega_i$, the angle and angular velocity of the first gimbal 111 assumed when angle $\theta_2$ satisfies the following expression with respect to correction angle range threshold value $\theta_{2t}$ for setting a correction range in which the corrected angular velocity instruction is used:

$$\theta_2 \geq 90 - \theta_{2t}$$

Based on the relationship between the moving object velocity estimation value and a remaining angle with respect to the zenith, zenith arrival remaining time $t_{rem}$ is give by $$t_{rem} = \frac{90 - \theta_{2t}}{\omega_t}$$

To avoid gimbal lock near the zenith due to an excessive angular velocity instruction value, a corrected orbit on which the visual axis of the camera sensor passes is imparted when the visual axis passes near the zenith. This orbit is imparted to orient the visual axis toward the zenith when the visual axis falls within the zenith range, and to orient the visual axis again toward the zenith when the visual axis departs from the zenith range. Namely, the first gimbal 111 assumes an orbit on which it is rotated through $2\theta_i$ in a time of $2t_{rem}$. Up to this, the corrected angular velocity instruction generating unit 173 performs the same operation as in the first embodiment.

When the first gimbal 111 is linearly accelerated/decelerated on the above orbit, a maximum corrected angular velocity for the first gimbal 111 is given by $$\dot{\theta}'_{r1max} = -\frac{2\theta_i}{2t_{rem}}$$

When the first gimbal 111 is accelerated or decelerated in accordance with the angle $\theta_2$ of the second gimbal 121, an angular acceleration included in an angular velocity instruction, which causes the maximum corrected angular velocity at the zenith, is given by $$\ddot{\theta}'_{r1} = \frac{\dot{\theta}'_{r1max}}{\theta_{2t}}$$

If the above equation is used, the following corrected angular velocity instruction is determined:

$$\dot{\theta}'_{r1} = \ddot{\theta}'_{r1} \times (\theta_2 - (90 - \theta_{2t})) \quad 90 - \theta_{2t} \leq \theta_2 \leq 90$$

$$\dot{\theta}'_{r1} = \dot{\theta}'_{r1max} - \ddot{\theta}'_{r1} \times (\theta_2 - 90) \quad 90 \leq \theta_2 \leq 90 + \theta_{2t}$$

The angular velocity correction unit 174 corrects an angular velocity instruction for a position near the zenith, using the thus-determined corrected angular velocity instruction values.

Figure 12:
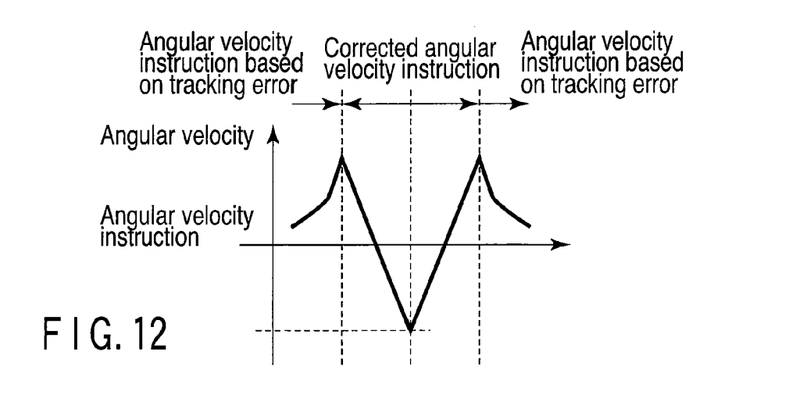
FIG. 12 is a view illustrating a temporal history, obtained in the third embodiment, of the angular velocity of the first gimbal that reflects whether the visual axis of the camera sensor falls within the zenith correction range.

Referring then to FIG. 12, a description will be given of variations with time in angular velocity, assumed when the angular velocity correction unit 174 selects either an angular velocity instruction based on tracking errors or a corrected angular velocity instruction, depending upon whether the visual axis of the camera sensor falls within the zenith correction range.

When the visual axis falls outside the zenith correction range, the angular velocity correction unit 174 selects an angular velocity instruction based on the tracking error detection values ($\Delta X$, $\Delta Y$), thereby causing the driving control unit 160 to rotate the first gimbal 111 to track a target. When the visual axis falls within the zenith correction range, the angular velocity correction unit 174 selects a corrected angular velocity instruction. In this case, if the visual axis falls within the zenith correction range when the first gimbal 111 is rotated through $\theta_i$, a corrected angular velocity instruction for shifting the rotation angle from $\theta_i$ to the zero axis and then to $-\theta_i$. When the visual axis again falls outside the zenith correction range, the angular velocity instruction based on tracking errors is again output.

As described above, in the third embodiment, while the target enters the zenith correction range, then passes the zenith and departs from the zenith correction range, the angular velocity of the gimbal structure is gradually varied, with the result that no excessive load is exerted on the gimbal structure. This prevents, for example, the gimbal structure from failure. Therefore, the biaxial gimbal structure can be made simple in structure, and can track a moving object passing through the zenith or near the same, without requiring excessive motor performance.

The moving object image tracking apparatus of the embodiments effectively serves as a tracking camera system of an omnidirectional biaxial gimbal structure installed in a mobile apparatus that is provided with, for example, a TV camera, camera seeker or automatic surveying tool.

As described in the embodiments, even the biaxial gimbal structure can avoid, near the zenith, gimbal lock due to excessive angular velocity instruction values, and an appropriate angular velocity instruction for tracking a moving object can be generated to improve tracking characteristics, since the second gimbal has a movable range ranging from the front side of the tracking apparatus to the rear side, a moving object velocity estimation value is computed based on angle data at and near the zenith, and the gimbal structure is driven by a corrected angular velocity instruction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving object image tracking apparatus comprising:
a first rotation unit configured to rotate about an azimuth axis vertically oriented and rotatably supported;
a second rotation unit configured to rotate about an elevation axis rotatably supported and horizontally oriented, the elevation axis being perpendicular to the azimuth axis;

a driving unit configured to drive the first rotation unit and the second rotation unit to rotate independent of each other;
an acquisition unit supported by the second rotation unit and configured to acquire image data of a moving object by photography;
a first detection unit configured to detect, from the image data, a tracking error detection value indicating a tracking error as a deviation of the moving object from a center of a field of view of the acquisition unit;
a second detection unit configured to detect a first angle indicating a first attitude of the first rotation unit;
a third detection unit configured to detect a second angle indicating a second attitude of the second rotation unit;
a first computation unit configured to compute a first angular velocity of the first rotation unit and a second angular velocity of the second rotation unit, using the tracking error detection value and the first angle and the second angle;
a determination unit configured to determine whether the moving object falls within a correction range, referring to the second angle, the correction range being defined by a correction range angle threshold value set with respect to a zenith;
a second computation unit configured to compute a moving velocity of the moving object by executing temporal differentiation on the first angle and the second angle;
a third computation unit configured to compute a period of time in which the moving object falls within the correction range, based on the correction range angle threshold value and the moving velocity;
a fourth detection unit configured to detect, as an approach angle, the first angle assumed when the moving object enters the correction range;
a setting unit configured to set the first angular velocity and the second angular velocity as angular velocity instruction values for the first rotation unit and the second rotation unit when it is determined that the moving object falls outside the correction range, and configured to set the second angular velocity and a third angular velocity as the angular velocity instruction values when it is determined that the moving object falls within the correction range, the third angular velocity being obtained by dividing the approach angle by the period of time, the third angular velocity being used to rotate the first rotation unit toward a zero axis along which the moving object approaches the acquisition unit;
a fifth detection unit configured to detect a fourth angular velocity and a fifth angular velocity of the first rotation unit and the second rotation unit, respectively; and
a control unit configured to control the driving unit to eliminate a difference between the fourth angular velocity and an angular velocity indicated by one of the angular velocity instruction values corresponding to the first rotation unit, and configured to control the driving unit to eliminate a difference between the fifth angular velocity and an angular velocity indicated by another one of the angular velocity instruction values corresponding to the second rotation unit.

2. The apparatus according to claim 1, wherein the second rotation unit is rotatable about the elevation axis at least through 180° such that the second rotation unit tracks the moving object that moves from a front side of the apparatus to a rear side thereof, passing the zenith.

3. The apparatus according to claim 1, wherein if it is determined that the moving object falls within the correction range, the setting unit sets the second angular velocity and the third angular velocity to take a position on which the azimuth axis assumes 0° and the elevation axis assume 90° simultaneously when the moving object reaches a position closest to the zenith.

4. The apparatus according to claim 1, wherein the correction range angle threshold value is determined based on a difference between an angle of the elevation axis assumed when the moving object is positioned nearest the zenith and a maximum angle of the elevation axis that is tracked by the angular velocity instruction values including the first angular velocity and the second angular velocity.

5. The apparatus according to claim 1, further comprising a zenith determination unit configured to determine whether the moving object has passed the zenith, referring to the second angle, and
wherein the setting unit sets the third angular velocity within the correction range to rotate the first rotation unit to make the first angle and the approach angle symmetrical with respect to the zero axis, when it is determined that the moving object falls within the correction range and has passed the zenith.

6. A moving object image tracking apparatus comprising:
a first rotation unit configured to rotate about an azimuth axis vertically oriented and rotatably supported;
a second rotation unit configured to rotate about an elevation axis rotatably supported and horizontally oriented, the elevation axis being perpendicular to the azimuth axis;
a driving unit configured to drive the first rotation unit and the second rotation unit to rotate independent of each other;
an acquisition unit supported by the second rotation unit and configured to acquire image data of a moving object by photography;
a first detection unit configured to detect, from the image data, a tracking error detection value indicating a tracking error as a deviation of the moving object from a center of a field of view of the acquisition unit;
a second detection unit configured to detect a first angle indicating a first attitude of the first rotation unit;
a third detection unit configured to detect a second angle indicating a second attitude of the second rotation unit;
a first computation unit configured to compute a first angular velocity of the first rotation unit and a second angular velocity of the second rotation unit, using the tracking error detection value and the first angle and the second angle;
a determination unit configured to determine, referring to the second angle, whether the moving object falls within a correction range and whether the moving object has passed the zenith, the correction range being defined by a correction range angle threshold value set with respect to a zenith;
a second computation unit configured to compute a moving velocity of the moving object by executing temporal differentiation on the first angle and the second angle;
a third computation unit configured to compute a period of time in which the moving object falls within the correction range, based on the correction range angle threshold value and the moving velocity;
a fourth detection unit configured to detect, as an approach angle, the first angle assumed when the moving object enters the correction range;
a setting unit configured to set the first angular velocity and the second angular velocity as angular velocity instruction values for the first rotation unit and the second rotation unit when it is determined that the moving object falls outside the correction range, or when it is determined that the moving object falls within the correction range and has passed the zenith, and configured to set the second angular velocity and a third angular velocity as the angular velocity instruction values when it is determined that the moving object falls within the correction range and has not yet passed the zenith, the third angular velocity being obtained by dividing the approach angle by the period of time, the third angular velocity being used to rotate the first rotation unit toward a zero axis along which the moving object approaches the acquisition unit;

a fifth detection unit configured to detect a fourth angular velocity and a fifth angular velocity of the first rotation unit and the second rotation unit, respectively; and a control unit configured to control the driving unit to eliminate a difference between the fourth angular velocity and an angular velocity indicated by one of the angular velocity instruction values corresponding to the first rotation unit, and configured to control the driving unit to eliminate a difference between the fifth angular velocity and an angular velocity indicated by another one of the angular velocity instruction values corresponding to the second rotation unit.

7. A moving object image tracking method comprising:
preparing a first rotation unit configured to rotate about an azimuth axis vertically oriented and rotatably supported;
preparing a second rotation unit configured to rotate about an elevation axis rotatably supported and horizontally oriented, the elevation axis being perpendicular to the azimuth axis;
driving the first rotation unit and the second rotation unit to rotate independent of each other;
preparing an acquisition unit supported by the second rotation unit and configured to acquire image data of a moving object by photography;
detecting, from the image data, a tracking error detection value indicating a tracking error as a deviation of the moving object from a center of a field of view of the acquisition unit;
detecting a first angle indicating a first attitude of the first rotation unit;
detecting a second angle indicating a second attitude of the second rotation unit;
computing a first angular velocity of the first rotation unit and a second angular velocity of the second rotation unit, using the tracking error detection value and the first angle and the second angle;
determining whether the moving object falls within a correction range, referring to the second angle, the correction range being defined by a correction range angle threshold value set with respect to a zenith;
computing a moving velocity of the moving object by executing temporal differentiation on the first angle and the second angle;
computing a period of time in which the moving object falls within the correction range, based on the correction range angle threshold value and the moving velocity;
detecting, as an approach angle, the first angle assumed when the moving object enters the correction range;
setting the first angular velocity and the second angular velocity as angular velocity instruction values for the first rotation unit and the second rotation unit when it is determined that the moving object falls outside the correction range;
setting the second angular velocity and a third angular velocity as the angular velocity instruction values when it is determined that the moving object falls within the correction range, the third angular velocity being obtained by dividing the approach angle by the period of time, the third angular velocity being used to rotate the first rotation unit toward a zero axis along which the moving object approaches the acquisition unit;

detecting a fourth angular velocity and a fifth angular velocity of the first rotation unit and the second rotation unit, respectively; and executing control to eliminate a difference between the fourth angular velocity and an angular velocity indicated by one of the angular velocity instruction values corresponding to the first rotation unit, executing control to eliminate a difference between the fifth angular velocity and an angular velocity indicated by another one of the angular velocity instruction values corresponding to the second rotation unit.

8. A moving object image tracking method comprising:
preparing a first rotation unit configured to rotate about an azimuth axis vertically oriented and rotatably supported;
preparing a second rotation unit configured to rotate a second rotation unit about an elevation axis rotatably supported and horizontally oriented, the elevation axis being perpendicular to the azimuth axis;
driving the first rotation unit and the second rotation unit to rotate independent of each other;
preparing an acquisition unit supported by the second rotation unit and configured to acquire image data of a moving object by photography;
detecting, from the image data, a tracking error detection value indicating a tracking error as a deviation of the moving object from a center of a field of view of the acquisition unit;
detecting a first angle indicating a first attitude of the first rotation unit;
detecting a second angle indicating a second attitude of the second rotation unit;
computing a first angular velocity of the first rotation unit and a second angular velocity of the second rotation unit, using the tracking error detection value and the first angle and the second angle;
determining, referring to the second angle, whether the moving object falls within a correction range and whether the moving object has passed the zenith, the correction range being defined by a correction range angle threshold value set with respect to a zenith;
computing a moving velocity of the moving object by executing temporal differentiation on the first angles and the second angle;
computing a period of time in which the moving object falls within the correction range, based on the correction range angle threshold value and the moving velocity;
detecting, as an approach angle, the first angle assumed when the moving object enters the correction range;
setting the first angular velocity and the second angular velocity as angular velocity instruction values for the first rotation unit and the second rotation unit when it is determined that the moving object falls outside the correction range, or when it is determined that the moving object falls within the correction range and has passed the zenith;
setting the second angular velocity and a third angular velocity as the angular velocity instruction values when it is determined that the moving object falls within the correction range and has not yet passed the zenith, the third angular velocity being obtained by dividing the approach angle by the period of time, the third angular velocity being used to rotate the first rotation unit toward a zero axis along which the moving object approaches the acquisition unit;

detecting a fourth angular velocity and a fifth angular velocity of the first rotation unit and the second rotation unit, respectively; and executing control to eliminate a difference between the fourth angular velocity and an angular velocity indicated by one of the angular velocity instruction values corresponding to the first rotation unit executing control to eliminate a difference between the fifth angular velocity and an angular velocity indicated by another one of the angular velocity instruction values corresponding to the second rotation unit.

* * * * *